(12) United States Patent
Hosaka

(10) Patent No.: US 9,129,613 B2
(45) Date of Patent: Sep. 8, 2015

(54) OPTICAL INFORMATION REPRODUCING DEVICE

(75) Inventor: Makoto Hosaka, Tokyo (JP)

(73) Assignee: HITACHI CONSUMER ELECTRONICS CO., LTD., Kanagawa (JP)

(*) Notice: Subject to any disclaimer, the term of this patent is extended or adjusted under 35 U.S.C. 154(b) by 0 days.

(21) Appl. No.: 14/390,412

(22) PCT Filed: Apr. 6, 2012

(86) PCT No.: PCT/JP2012/002409
§ 371 (c)(1),
(2), (4) Date: Oct. 3, 2014

(87) PCT Pub. No.: WO2013/150565
PCT Pub. Date: Oct. 10, 2013

(65) Prior Publication Data
US 2015/0179208 A1 Jun. 25, 2015

(51) Int. Cl.
*G11B 7/00* (2006.01)
*G11B 7/0065* (2006.01)
*G11B 20/18* (2006.01)

(52) U.S. Cl.
CPC .............. *G11B 7/0065* (2013.01); *G11B 20/18* (2013.01)

(58) Field of Classification Search
CPC .... G11B 7/0065; G11B 7/083; G11B 7/1353; G11B 2007/0006; G11B 7/0945
USPC ................ 369/103, 44.27, 44.28, 112.1, 126
See application file for complete search history.

(56) References Cited

U.S. PATENT DOCUMENTS

| 8,054,737 | B2* | 11/2011 | Shintani ...................... 369/126 |
| 2004/0179251 | A1 | 9/2004 | Anderson et al. |
| 2008/0192311 | A1 | 8/2008 | Horimai |

FOREIGN PATENT DOCUMENTS

| JP | 2003-521794 A | 7/2003 |
| JP | 2004-272268 A | 9/2004 |
| JP | 2008-139125 A | 6/2008 |
| WO | 2004102542 A1 | 11/2004 |

* cited by examiner

*Primary Examiner* — Nabil Hindi
(74) *Attorney, Agent, or Firm* — Volpe and Koenig, P.C.

(57) ABSTRACT

An optical information reproducing device, takes advantage of holography and can precisely detect a well-known pattern disposed at a prescribed location within a page and is used for correcting position deviation, rotation deviation, and magnification deviation. The optical fiber reproducing device includes a detection unit that detects the position information of a marker as a well-known pattern from a page as a 2-dimensional reproduction signal from a hologram, a detection error position estimating unit that estimates presence/absence of detection error in the position information of the marker and estimates the position where the detection error occurs if there is detection error, a position correcting unit that corrects the marker position information of the detection error position specified by the detection error position estimating unit, and a signal detection unit that detects each signal from within the page based on the corrected marker position information.

10 Claims, 17 Drawing Sheets

(a) (b)

(1)  (2)

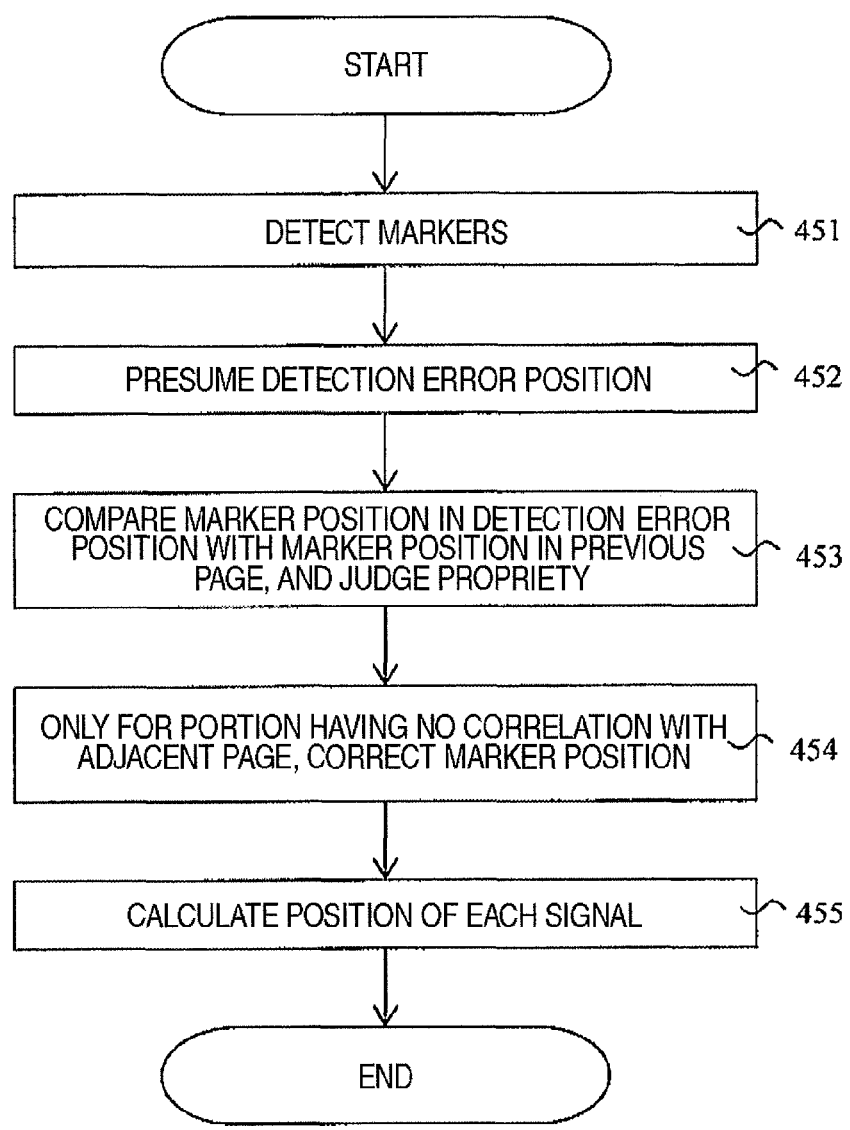

OPTICAL INFORMATION REPRODUCING DEVICE

TECHNICAL FIELD

The present invention relates to a device that reproduces information from recording media by using holography.

BACKGROUND ART

At the present time, merchandising of an optical disc having a recording density of approximately 100 GB is possible for public welfare as well owing to Blu-ray Disc™ standard using a blue-violet semiconductor laser. Hereafter, implementation of a large capacity exceeding 500 GB is desired in the optical disc as well. For implementing such an ultrahigh density in the optical disc, however, a high-density technique according to a new system different from the conventional high-density technique using a shorter wavelength and a higher NA of the object lens is necessary.

In the midst of studies concerning a storage technique of next generation, the hologram recording technique of recording digital information by utilizing the holography attracts attention. As for the hologram recording technique, there is, for example, JP-A-2004-272268 (Patent Literature 1). JP-A-2004-272268 describes the so-called angular multiplexing recording system, in which different page data is displayed on a spatial light modulator while an incidence angle of a reference beam onto optical information recording media is changed and multiplexing recording is conducted. In addition, JP-A-2004-272268 describes a technique of shortening the spacing between adjacent holograms by focusing a signal beam with a lens and disposing an aperture (spatial filter) in its beam waist.

Furthermore, as for the hologram recording technique, there is, for example, WO2004-102542 (Patent Literature 2). In an example using a shift multiplexing system described in WO2004102542, a beam from inner pixels is used as a signal beam and a beam from outer strip shaped pixels is used as a reference beam in one spatial light modulator. Both beams are focused onto optical information recording media by using the same lens. The signal beam and the reference beam are caused to interfere with each other in the vicinity of a focal point plane of the lens, and holograms are recorded.

As for a marker retrieval technique at the time of hologram reproducing, there is, for example, JP-A-2008-139125 (Patent Literature 3). In JP-A-2008-139125, there is description "A hologram data area identification device 1 identifies a hologram data area, which is an area occupied by a hologram, from, a hologram image which is input from a photodetector. The hologram data area identification device 1 includes a frame buffer memory 3, an edge detection means 5, template comparison means 7, a template image storage means 9, and a centroid detection means 11."

CITATION LIST

Patent Literature

PATENT LITERATURE 1: JP-A-2004-272268
PATENT LITERATURE 2: WO-2004-102542
PATENT LITERATURE 3: JP-A-2008-139125

SUMMARY OF INVENTION

Technical Problem

By the way, in an optical information reproducing device utilizing holography, a known pattern disposed in a predetermined place in a page is detected when reproducing information, and position deviation, rotation deviation, magnification deviation, and the like are coped with on the basis of position information of the known pattern. However, there is a problem that the signal-to-noise ratio (SNR) becomes low in a case where an error has occurred in detection of the known pattern. This is caused by false detection of the known pattern in a case where user data resembling the known pattern exists near the known pattern.

In the technique described in Patent Literature 3, there is no disclosure at all concerning the problem or configuration as to whether the value of the known pattern is used after confirming the reliability of the known pattern as described above.

The present invention has been achieved in view of the above-described problem. It is an object of the present invention to provide an optical information reproducing device and its method capable of detecting a known pattern in a page with high precision in a holographic memory.

Solution to Problem

The above-described problem is solved by, for example, judging the reliability of the marker value itself.

Advantageous Effects of Invention

According to the present invention, it is possible to detect a known patter in a page with high precision in a holographic memory.

BRIEF DESCRIPTION OF DRAWINGS

FIG. 17 is a schematic diagram showing an embodiment of an operation flow of signal position detection in an optical information recording and reproducing device.

DESCRIPTION OF EMBODIMENTS

Hereafter, embodiments of the present invention will be described with reference to the drawings.

Embodiment 1

A first embodiment of the present invention will now be described with reference to FIGS. 1 to 14.

Figure 2:
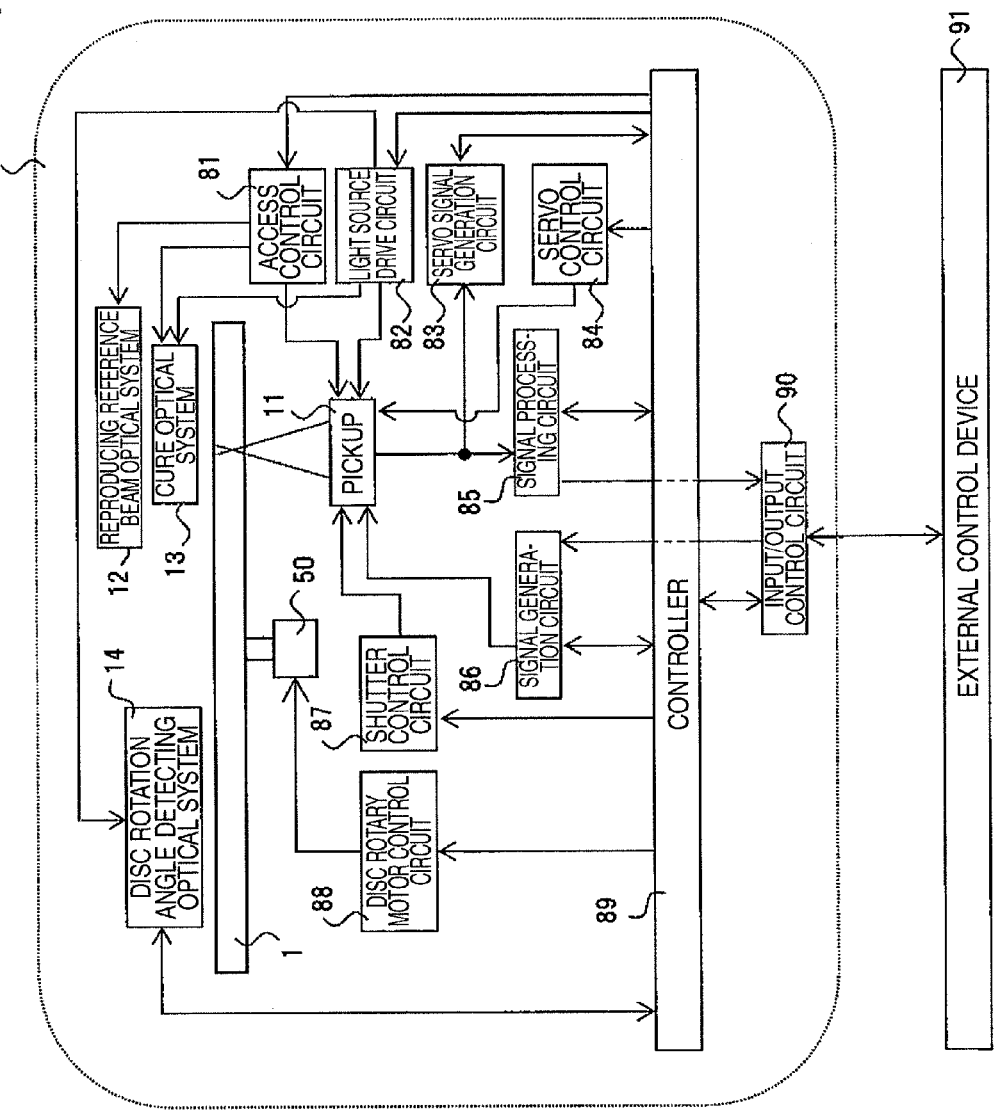
FIG. 2 is a schematic diagram showing an embodiment of an optical information recording and reproducing device.

FIG. 2 is a block diagram showing a recording and reproducing device of optical information recording media for recording and/or reproducing digital information by utilizing holography.

An optical information recording and reproducing device 10 is connected to an external control device 91 via an input/output control circuit 90. At the time of recording, the optical information recording and reproducing device 10 receives an information signal to be recorded, from the external control device 91 by using the input/output control circuit 90. At the time of reproducing, the optical information recording and reproducing device 10 transmits a reproduced information signal to the external control device 91 by using the input/output control circuit 90.

The optical information recording and reproducing device 10 includes a pickup 11, a reproducing reference beam optical system 12, a cure optical system 13, a disc rotation angle detecting optical system 14 and a rotary motor 50. Optical information recording media 1 is configured to be capable of being rotated by the rotary motor 50.

The pickup 11 plays a role of emitting a reference beam and a signal beam onto the optical information recoding media 1 and recording digital information on the recording media by utilizing holography. At this time, an information signal to be recorded is sent into a spatial light modulator in the pickup 11 via a signal generation circuit 86 by a controller 89, and the signal beam is modulated by the spatial light modulator.

When reproducing information recorded on the optical information recording media 1, the reproducing reference beam optical system 12 generates a light wave to cause the reference beam emitted from the pickup 11 to be incident on the optical information recording media in a sense opposite to that at the time of recording. A photodetector, which will be described later, in the pickup 11 detects a reproduced beam reproduced by using the reproducing reference beam. A signal processing circuit 85 reproduces a signal.

The controller 89 controls open/close time of a shutter in the pickup 11 via a shutter control circuit 87. As a result, irradiation time of the reference beam and the signal beam with which the optical information recording media 1 is irradiated can be adjusted.

The cure optical system 13 plays a role of generating a light beam used in precure and postcure of the optical information recording media 1. The precure is a preprocess of irradiating a desired position in the optical information recording media 1 with a predetermined light beam before irradiating the desired position with the reference beam and the signal beam when recording information in the desired position. The postcure is a post-process of irradiating a desired position in the optical information recording media 1 with a predetermined light beam to make rewriting impossible after information is recorded in the desired position.

The disc rotation angle detecting optical system 14 is used to detect a rotation angle of the optical information recording media 1. When adjusting the optical information recording media 1 to a predetermined rotation angle, the disc rotation angle detecting optical system 14 detects a signal depending upon the rotation angle and the controller 89 can control the rotation angle of the optical information recording media 1 via a disc rotary motor control circuit 88 by using the detected signal.

A light source drive circuit 82 supplies a predetermined light source drive current to light sources in the pickup 11, the cure optical system 13, and the disc rotation angle detecting optical system 14. Light sources can emit light beams with predetermined light quantities, respectively.

Furthermore, as for each of the pickup 11 and the disc cure optical system 13, a mechanism capable of sliding a position in a radial direction of the optical information recording media 1 is provided. Position control is exercised via an access control circuit 81.

By the way, the recording technique utilizing the principle of the angular multiplexing of holography has tendency that an allowable error for angle deviation of the reference beam becomes extremely small.

Therefore, it becomes necessary that a mechanism for detecting a deviation quantity of the reference beam angle is provided in the pickup 11, a servo signal generation circuit 83 generates a signal for servo control, and a servo mechanism for correcting the deviation quantity via a servo control circuit 84 is provided in the optical information recording and reproducing device 10.

Furthermore, as for the pickup 11, the cure optical system 13, and the disc rotation angle detecting optical system 14, several optical system configurations or all optical system configurations may be collected to one configuration and simplified.

Figure 3:
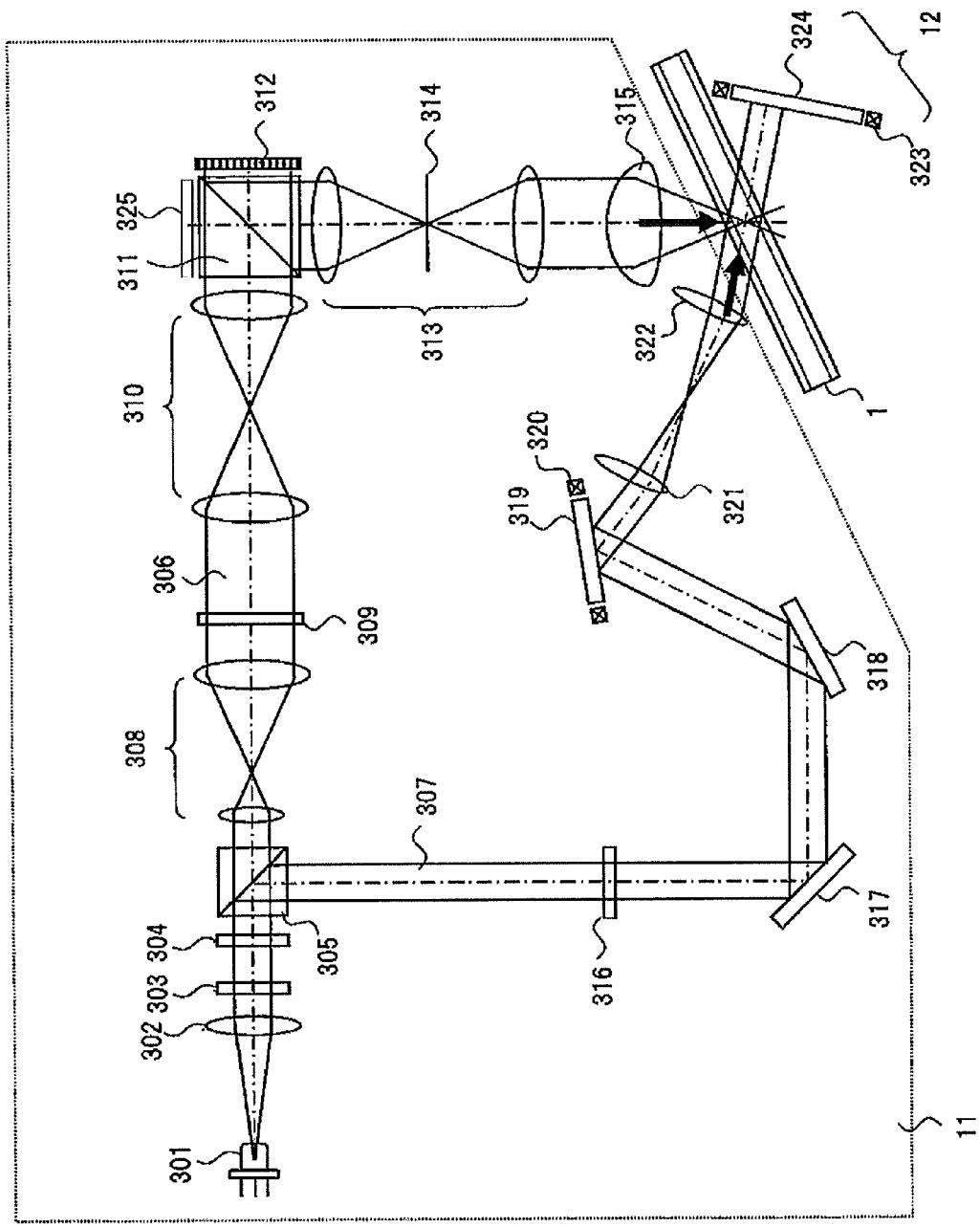
FIG. 3 is a schematic diagram showing an embodiment of a pickup in an optical information recording and reproducing device.

FIG. 3 shows a recording principle in an example of a basic optical system configuration of the pickup 11 in the optical information recording and reproducing device 10. A light beam emitted from a light source 301 passes through a collimate lens 302 and incident on a shutter 303. When the shutter 303 is open, the light beam passes through the shutter 303. Then, the light beam is controlled in polarization direction to have a light quantity ratio between p-polarized light and s-polarized light set to a desired ratio by an optical element 304 including, for example, a half-wave plate. Then, the light beam is incident on a PBS (Polarization Beam Splitter) prism 305.

The light beam which has passed through the PBS prism 305 functions as a signal beam 306. After being expanded in light beam diameter by a beam expander 308, the signal beam passes through a phase mask 309, a relay lens 310 and a PBS prism 311 and is incident on a spatial light modulator 312.

The signal beam added with information by the spatial light modulator 312 is reflected by the PBS prism 311, and propagates through a relay lens 313 and a spatial filter 314.

Then, the signal beam is focused onto the optical information recording media 1 by an object lens 315.

On the other hand, the light beam reflected by the PBS prism 305 functions as a reference beam 307. The reference beam 307 is set to a predetermined polarization direction depending upon whether to conduct recording or reproducing by a polarization direction conversion element 316. Then, the reference beam 307 is incident on a galvanometer mirror 319 via a mirror 317 and a mirror 318. Since the galvanometer mirror 319 can be adjusted in angle by an actuator 320, an incidence angle of the reference beam incident on the optical information recording media 1 after passing through a lens 321 and a lens 322 can be set to a desired angle. By the way, in order to set the incidence angle of the reference beam, an element that converts a wave surface may be used instead of the galvanometer mirror.

In this way, the signal beam and the reference beam are incident on the optical information recording media 1 to overlap each other. As a result, an interference fringe pattern is formed in the recording media. Information is recorded by writing this pattern into the recording media. Furthermore, since the incidence angle of the reference beam incident on the optical information recording media 1 can be changed by the galvanometer mirror 319, recording using angular multiplexing is possible.

Hereafter, in holograms recorded in the same area with the reference beam angle changed, a hologram corresponding to each reference beam angle is referred to as page, and a set of pages angular-multiplexed in the same area is referred to as book.

Figure 4:
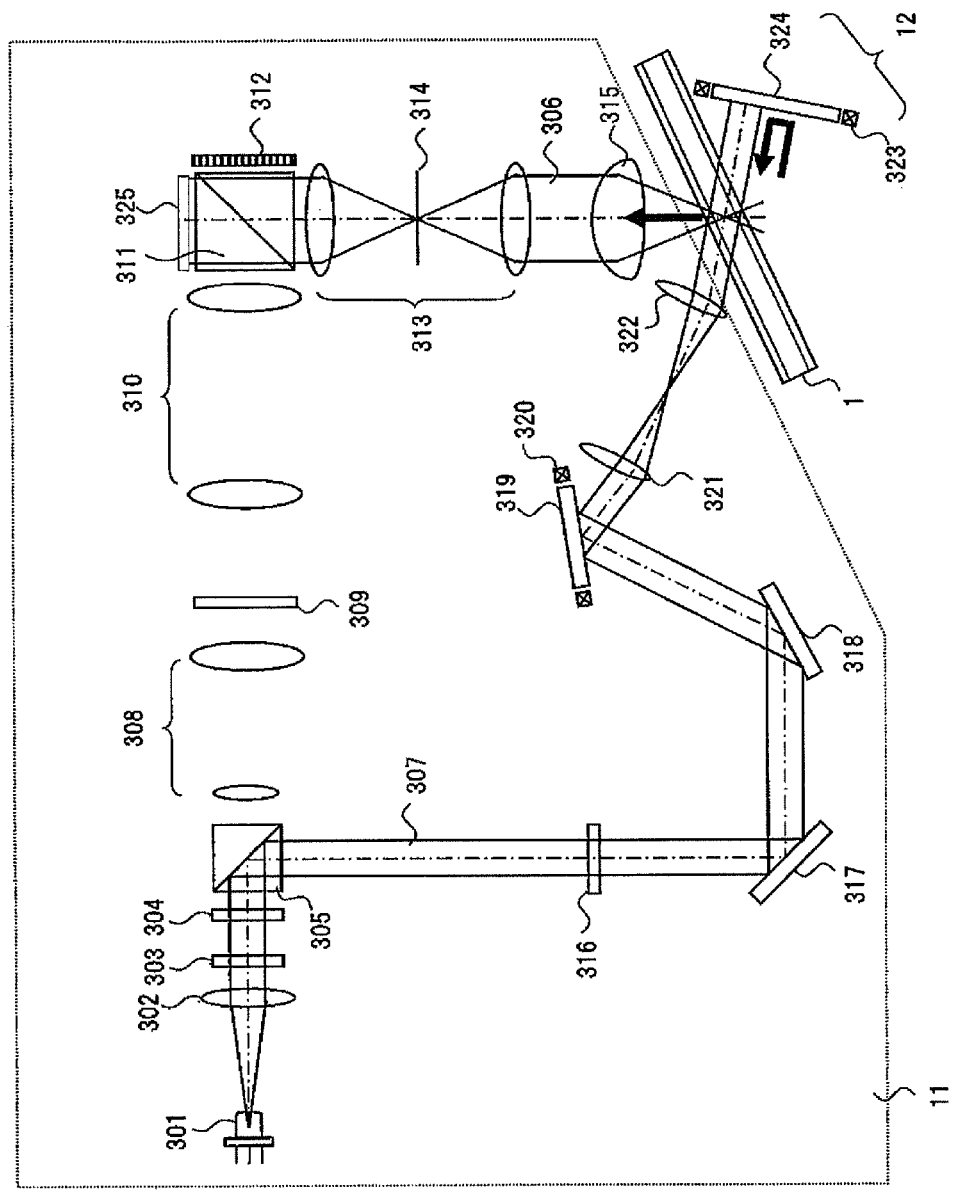
FIG. 4 is a schematic diagram showing an embodiment of a pickup in an optical information recording and reproducing device.

FIG. 4 shows a principle of reproducing in an example of a basic optical system configuration of the pickup 11 in the optical information recording and reproducing device 10. When reproducing recorded information, the reference beam is incident on the optical information recording media 1 as described above and a light beam that has passed through the optical information recording media 1 is reflected by a galvanometer mirror 324 which can be adjusted in angle by an actuator 323. As a result, a reference beam for reproducing is generated.

A reproduced beam reproduced by using the reproducing reference beam propagates through the object lens 315, the relay lens 313 and the spatial filter 314. Then, the reproduced beam passes through the PBS prism 311 and is incident on a photodetector 325, and the recorded signal can be reproduced. As the photodetector 325, an imaging element such as, for example, a CMOS image sensor or a CCD image sensor, can be used. However, any element may be used as long as the element can reproduce page data.

Figure 5:
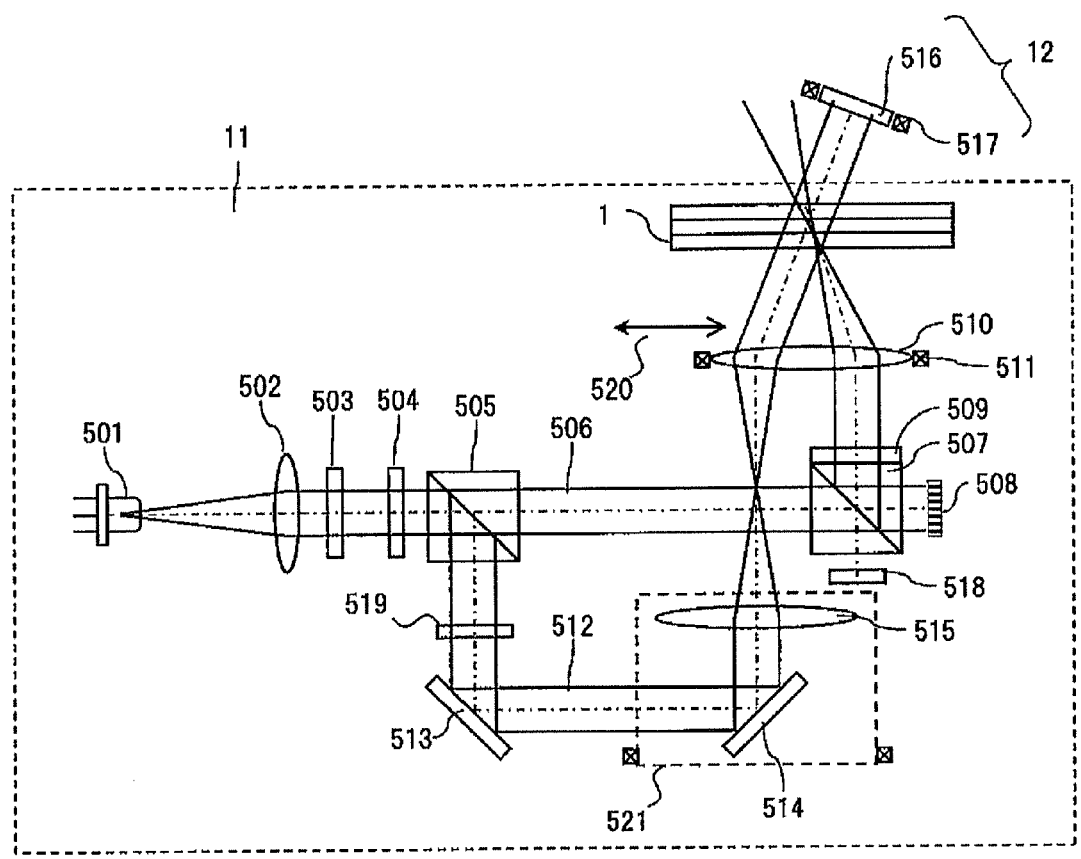
FIG. 5 is a schematic diagram showing an embodiment of a pickup in an optical information recording and reproducing device.

FIG. 5 is a diagram showing a different configuration of the pickup 11. In FIG. 5, a light beam emitted from a light source 501 passes through a collimate lens 502, and is incident on a shutter 503. When the shutter 503 is open, the light beam passes through the shutter 503. Then, the light beam is controlled in polarization direction to have a light quantity ratio between p-polarized light and s-polarized light set to a desired ratio by an optical element 504 including, for example, a half-wave plate. Then, the light beam is incident on a PBS prism 505.

The light beam which has passed through the PBS prism 505 is incident on a spatial light modulator 508 via a PBS prism 507. A signal beam 506 added with information by the spatial light modulator 508 is reflected by the PBS prism 507, and propagates through an angle filter 509 which passes through only a light beam of a predetermined incidence angle. Then, the signal beam is focused onto the hologram recording media 1 by an object lens 510.

On the other hand, the light beam reflected by the PBS prism 505 functions as a reference beam 512. The reference beam 512 is set to a predetermined polarization direction depending upon whether to conduct recording or reproducing by a polarization direction conversion element 519. Then, the reference beam 512 is incident on a lens 515 via a mirror 513 and a mirror 514. The lens 515 plays a role of focusing the reference beam 512 on a back focus plane of the object lens 510. The reference beam focused on the back focus plane of the object lens 510 once is converted to a parallel beam again by the object lens 510 and incident on the hologram recording media 1.

Here, the object lens 510 or an optical block 521 can be driven, for example, in a direction indicated by reference numeral 520. A relative position relation between the object lens 510 and a focal point on the back focus plane of the object lens 510 is changed by shifting the position of the object lens 510 or the optical block 521 along the drive direction 520. As a result, an incidence angle of the reference beam incident on the hologram recording media 1 can be set to a desired angle. By the way, the incidence angle of the reference beam may be set to a desired angle by driving the mirror 514 with an actuator instead of driving the object lens 510 or the optical block 521.

In this way, the signal beam and the reference beam are incident on the hologram recording media 1 while overlapping each other. As a result, an interference fringe pattern is formed in the recording media. Information is recorded by writing this pattern into the recording media. Furthermore, since the incidence angle of the reference beam incident on the hologram recording media 1 can be changed by shifting the position of the object lens 510 or the optical block 521 along the drive direction 520, recording using angular multiplexing is possible.

When reproducing recorded information, a reference beam for reproducing is generated by causing the reference beam to be incident on the hologram recording media 1 as described above and reflecting a light beam that has passed through the hologram recording media 1 with a galvanometer mirror 516. A reproduced beam reproduced by using the reproducing reference beam propagates through the object lens 510 and the angle filter 509. Then, the reproduced beam passes through the PBS prism 507 and is incident on a photodetector 518, and the recorded signal can be reproduced.

The optical system shown in FIG. 5 has a configuration in which the signal beam and the reference beam are incident on the same object lens. As a result, the optical system shown in FIG. 5 has an advantage that it can be reduced in size remarkably as compared with the configuration of the optical system.

Figure 6:
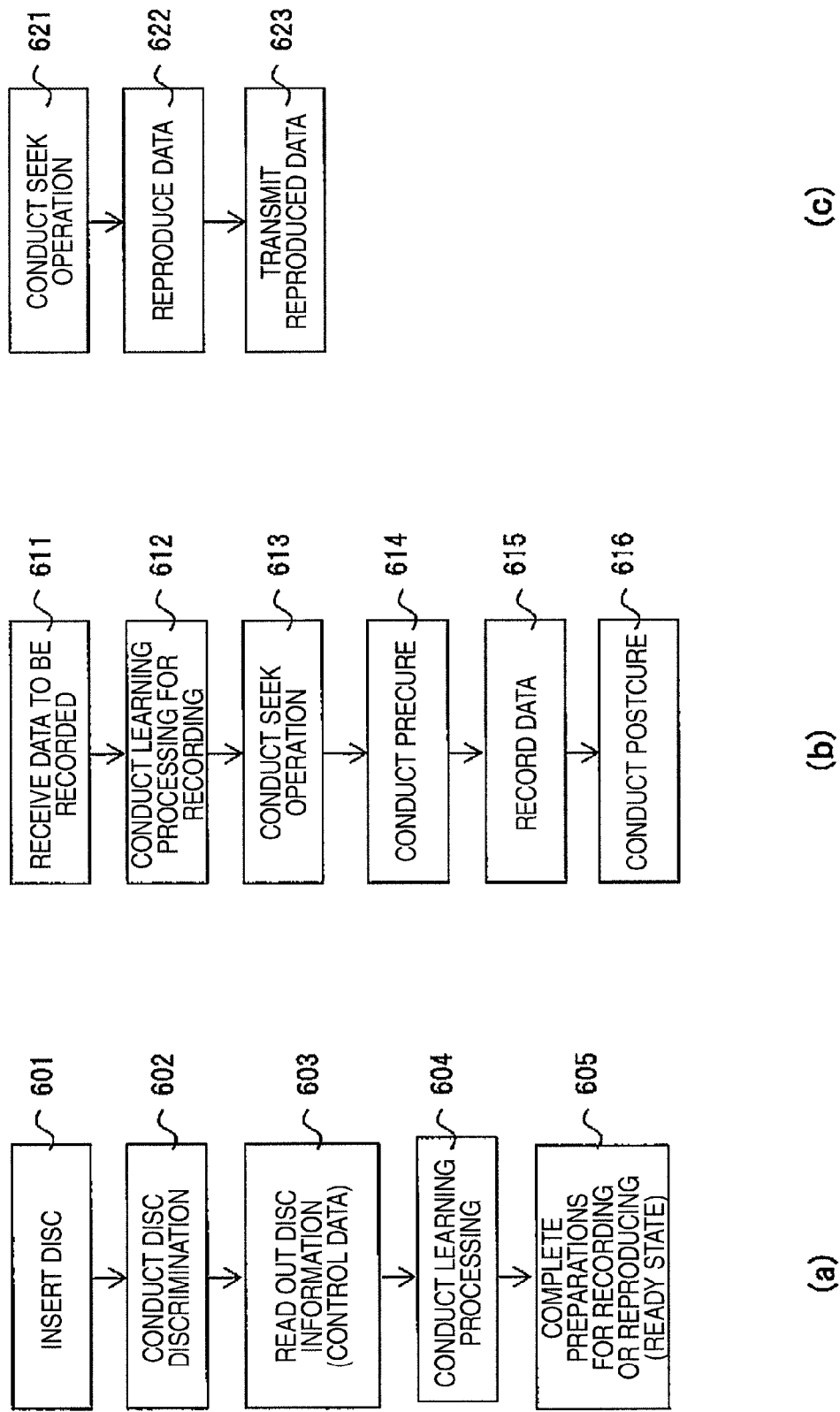
FIG. 6 is a schematic diagram showing an embodiment of an operation flow of an optical information recording and reproducing device.

FIG. 6 shows an operation flow of recording and reproducing in the optical information recording and reproducing device 10. In particular, a flow concerning recording and reproducing utilizing holography will now be described.

FIG. 6(a) shows a flow of operation conducted until preparations for, recording or reproducing are completed since the optical information recording media 1 is inserted into the optical information recording and reproducing device 10. FIG. 6(b) shows a flow of operation conducted until information is recorded on the optical information recording media 1 since a state in which the preparations are completed. FIG. 6(c) shows a flow of operation conducted until information recorded on the optical information recording media 1 is reproduced since the state in which the preparations are completed.

As shown in FIG. 6(a), media is inserted (601). The optical information recording and reproducing device 10 conducts disc discrimination to determine whether, for example, the inserted media is media on which recording or reproducing of digital information is conducted utilizing holography (602).

If it is determined as a result of the disc discrimination that the inserted media is media on which recording or reproducing of digital information is conducted utilizing holography, the optical information recording and reproducing device 10 reads out control data provided on the optical information recording media (603), and acquires, for example, information concerning the optical information recording media and, for example, information concerning various setting conditions at the time of recording or reproducing.

After reading the control data, the optical information recording and reproducing device 100 conducts various adjustments according to the control data and learning processing concerning the pickup 11 (604), and completes preparations for recording or reproducing (605).

The flow of operation conducted until information is recorded since the preparation completion state is shown in FIG. 6(*b*). First, the optical information recording and reproducing device 100 receives data to be recorded (611), and sends information depending upon the data into the spatial light modulator in the pickup 11.

Then, the optical information recording and reproducing device 100 previously conducts various kinds of learning processing for recording such as, for example, power optimization of the light source 301 and optimization of exposure time using the shutter, as occasion demands in order to make it possible to record high quality information on the optical information recording media (612).

Then, in seek operation (613), the optical information recording and reproducing device 10 controls the access control circuit 81 to position the pickup 11 and the cure optical system 13 in predetermined positions on the optical information recording media. In a case where the optical information recording media 1 has address information, the optical information recording and reproducing device 10 reproduces address information and ascertains whether the pickup 11 and the cure optical system 13 are positioned in target positions. Unless the pickup 11 and the cure optical system 13 are positioned in target positions, the optical information recording and reproducing device 10 calculates a deviation from a predetermined position and repeats the operation of positioning again.

Then, the optical information recording and reproducing device 10 precures a predetermined area by using the light beam emitted from the cure optical system 13 (614), and records data by using the reference beam and the signal beam emitted from the pickup 11 (615).

After recording data, the optical information recording and reproducing device 10 conducts postcure by using the light beam emitted from the cure optical system 13 (616). The optical information recording and reproducing device 10 may verify data as occasion demands.

The flow of operation conducted until information is reproduced since the preparation completion state is shown in FIG. 6(*c*). First, in seek operation (621), the optical information recording and reproducing device 10 controls the access control circuit 81 to position the pickup 11 and the cure optical system 13 in predetermined positions on the optical information recording media. In a case where the optical information recording media 1 has address information, the optical information recording and reproducing device 10 reproduces address information and ascertains whether the pickup 11 and the cure optical system 13 are positioned in target positions. Unless the pickup 11 and the cure optical system 13 are positioned in target positions, the optical information recording and reproducing device 10 calculates a deviation from a predetermined position and repeats the operation of positioning again.

Then, the optical information recording and reproducing device 10 emits the reference beam from the pickup 11, reads out information recorded on the optical information recording media (622), and transmits reproduced data (613).

Figure 9:
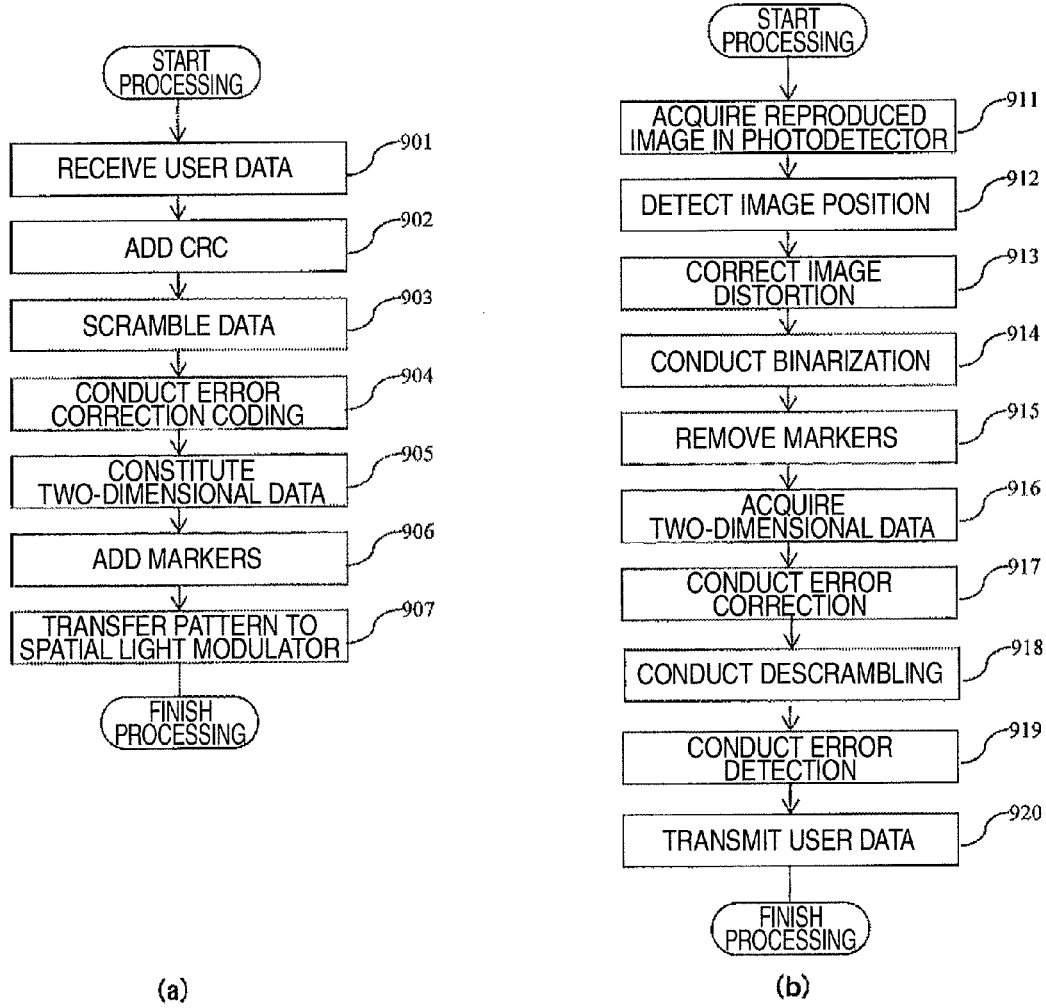
FIG. 9 is a schematic diagram showing an embodiment of an operation flow of a signal generation circuit and a signal processing circuit.

FIG. 9 shows a data processing flow at the time of recording and reproducing. FIG. 9(*a*) shows a flow of recording data processing in the signal generation circuit 86 conducted after receiving 611 of recording data in the input/output control circuit 90 until the recording data is converted to two-dimensional data on the spatial light modulator 312. FIG. 9(*b*) shows a flow of reproduced data processing in the signal processing circuit 85 after detection of two-dimensional data in the photodetector 325 until reproduced data transmission 624 in the input/output control circuit 90.

Data processing at the time of recording will now be described with reference to FIG. 9(*a*). Upon receiving user data (901), the user data is divided into a plurality of data strings and each data string is converted to CRC to make it possible to conduct error detection at the time of reproducing (902). With the object of making the number of on pixels nearly equal to the number of off pixels and preventing the same pattern from being repeated, scrambling of adding a pseudo random number data string to each data string is conducted (903). Then, error correction coding using the Reed-Solomon code or the like is conducted to make it possible to conduct error correction at the time of reproducing (904). Then, the data string is converted to M*N two-dimensional data and the conversion is repeated for one page data. Thereby, two-dimensional data corresponding to one page is constituted (905). Markers which become reference in image position detection and image distortion correction at the time of reproducing are added to the two-dimensional data constituted in this way (906). Resultant data is transferred to the spatial light modulator 312 (907).

The data processing flow at the time of reproducing will now be described with reference to FIG. 9(*b*). Image data detected by the photodetector 325 is transferred to the signal processing circuit 85 (911). An image position is detected by using markers included in the image data as reference (912). Distortions such as an inclination, a magnification and distortion of the image are corrected (913). Then, binarization processing is conducted (914). Markers are removed (915), and thereby two-dimensional data corresponding to one page is acquired (916). The two-dimensional data obtained in this way is converted to a plurality of data stings, and then error correction processing is conducted (917). And a parity data string is removed. Then, descrambling processing is conducted (918). Error detection processing using the CRC is conducted (919). After CRC parities are removed, user data is transmitted via the input/output control circuit 90 (920).

Figure 7:
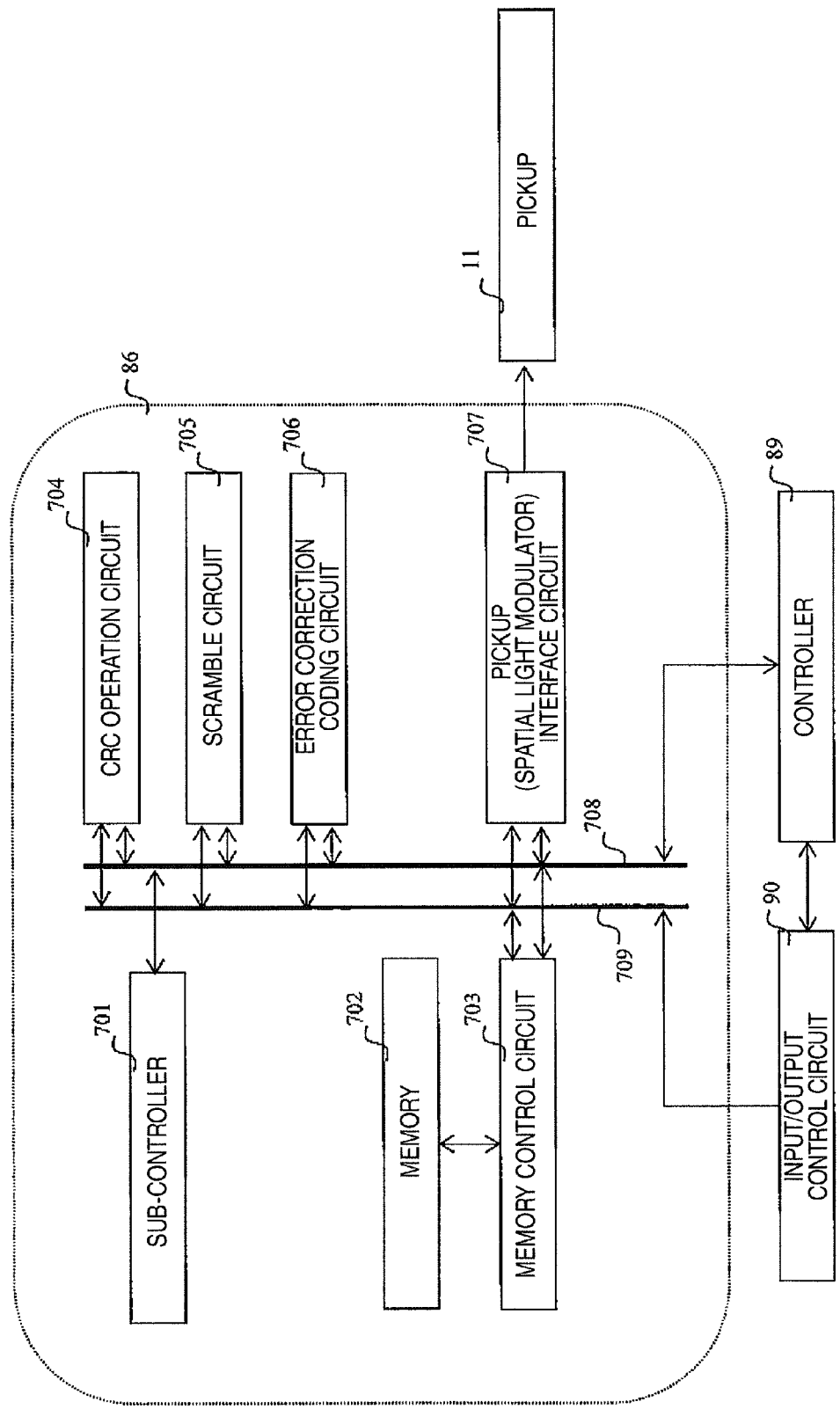
FIG. 7 is a schematic diagram showing an embodiment of a signal generation circuit in an optical information recording and reproducing device.

FIG. 7 is a block diagram of the signal generation circuit 86 in the optical information recording and reproducing device 10.

When input of user data to the output control circuit 90 is started, the input/output control circuit 90 gives a notice that input of user data is started to the controller 89. Upon receiving the notice, the controller 89 instructs the signal generation circuit 86 to conduct recording processing of data corresponding to one page which is input from the input/output control circuit 90. The processing instruction from the controller 89 is given to a sub-controller 701 in the signal generation circuit 86 via a control line 708. Upon receiving the instruction, the sub-controller 701 controls respective signal processing circuits via the control line 708 to cause the respective signal processing circuits to operate in parallel. First, the sub-controller 701 controls a memory control circuit 703 to store user data which is input from the input/output control circuit 90 via a data line 709 into a memory 702. If user data stored in the memory 702 amounts to a certain determinate quantity, a CRC operation circuit 704 exercises control to convert user data to CRC. Then, a scramble circuit 705 conducts scrambling to add a pseudo random number data string to data converted to CRC. An error correction coding circuit 706 exercises control to conduct error correction coding of adding a parity data string. Finally, a pickup interface circuit 707 reads out data subjected to error correction coding from the memory 702 in an arrangement order of two-dimensional data on the spatial light modulator 312, adds markers, which become reference at the time of reproducing, to the two-dimensional data, and then transfers resultant two-dimensional data to the spatial light modulator 312 in the pickup 11.

Figure 8:
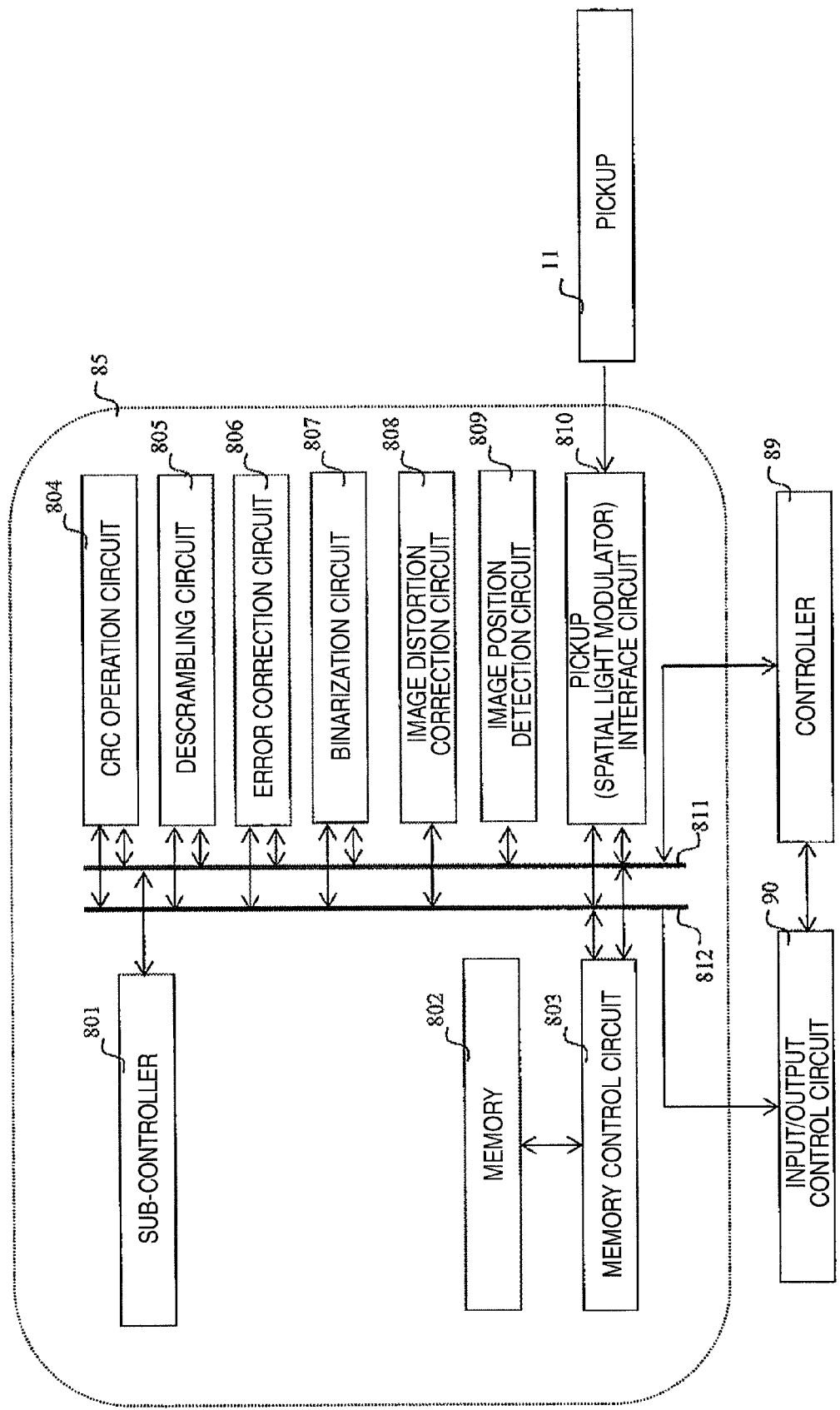
FIG. 8 is a schematic diagram showing an embodiment of a signal processing circuit in an optical information recording and reproducing device.

FIG. 8 is a block diagram of the signal processing circuit 85 in the optical information recording and reproducing device 10.

If the photodetector 325 in the pickup 11 detects image data, the controller 89 instructs the signal processing circuit 85 to conduct reproducing processing on data corresponding to one page which is input from the pickup 11. The processing instruction from the controller 89 is given to a sub-controller 801 in the signal processing circuit 85 via a control line 811. Upon receiving the instruction, the sub-controller 801 controls respective signal processing circuits via the control line 811 to operate the signal processing circuits in parallel. First, the sub-controller 801 controls a memory control circuit 803 to store image data, which is input from the pickup 11 via a pickup interface circuit 810 and a data line 812, into a memory 802. If data stored in the memory 802 amounts to a certain determinate quantity, the image position detection circuit 809 exercises control of detecting markers from image data stored in the memory 802 and extracting an effective data range. Then, an image distortion correction circuit 808 exercises control of conducting correction of distortions such as an inclination, a magnification and distortion of the image by using the detected markers and converting the image data to an expected size of two-dimensional data. A binarization circuit 807 exercises control of conducting binarization by determining whether each bit data in a plurality of bits included in two-dimensional data subjected to the size conversion is "0" or "1" and storing resultant data onto the memory 802 in an arrangement of output of reproduced data. Then, an error correction circuit 806 corrects an error included in each data string. A descrambling circuit 805 cancels scrambling which adds a pseudo random number data string. Then, a CRC operation circuit 804 confirms that an error is not contained in user data on the memory 802. Then, user data is transferred from the memory 802 to the input/output control circuit 90.

Figure 10:
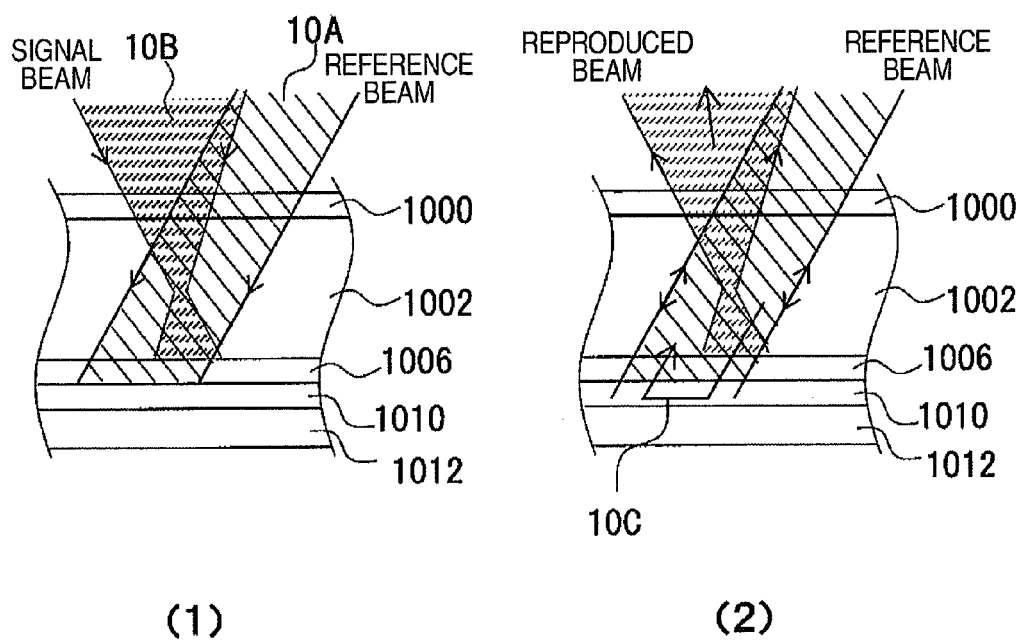
FIG. 10 is a schematic diagram showing an embodiment of a layer structure of optical information recording media having a reflection layer.

FIG. 10 is a diagram showing a layer structure of optical information recording media having a reflection layer. In FIG. 10, (1) indicates a state in which information is being recorded in the optical information recording media, and (2) indicates a state in which information is being reproduced from the optical information recording media.

The optical information recording media 1 includes a transparent cover layer 1000, a recording layer 1002, an optical absorption/optical transmission layer 1006, an optical reflection layer 1010, and a third transparent protection layer 1012 in order from the optical pickup 11 side. An interference pattern between a reference beam 10A and a signal beam 10B is recorded in the recording layer 1002.

The optical absorption/optical transmission layer 1006 changes in physical properties to absorb the reference beam 10A and the signal beam 10B at the time of information recording and transmit the reference beam at the time of information reproducing. For example, the coloring/decolorizing state of the optical absorption/optical transmission layer 1006 is changed by applying a voltage to the optical recording media 1. In other words, at the time of information recording, the optical absorption/optical transmission layer 1006 assumes the coloring state and absorbs the reference beam 10A and the signal beam 10B which have passed through the recording layer 1002. At the time of information reproducing, the optical absorption/optical transmission layer 1006 assumes the decolorizing state and transmits the reference beam (T. Ando et, al.: Technical Digest ISOM (2006), Th-PP-10). The reference beam 10A which has passed through the optical absorption/optical transmission layer 1006 is reflected by the optical reflection layer 1010 and becomes a reference beam for reproducing 10C.

Furthermore, WO3 functioning as an electrochromic (EC) material described in A. Hirotsune et. al.: Technical Digest ISOM (2006), Mo-B-04 can be used in the optical absorption/optical transmission layer 1006.

Coloring and decolorizing are caused reversibly by applying a voltage to this material. At the time of information recording, coloring is caused and the beam is absorbed. At the time of information reproducing, decolorizing is caused and the beam is transmitted.

Owing to the configuration shown in FIG. 10, the reference beam optical system for reproducing becomes unnecessary and size shrinking of the drive becomes possible.

Here, the present inventor will describe a technique for detecting a known pattern in a page in a holographic memory with high precision.

Figure 12:
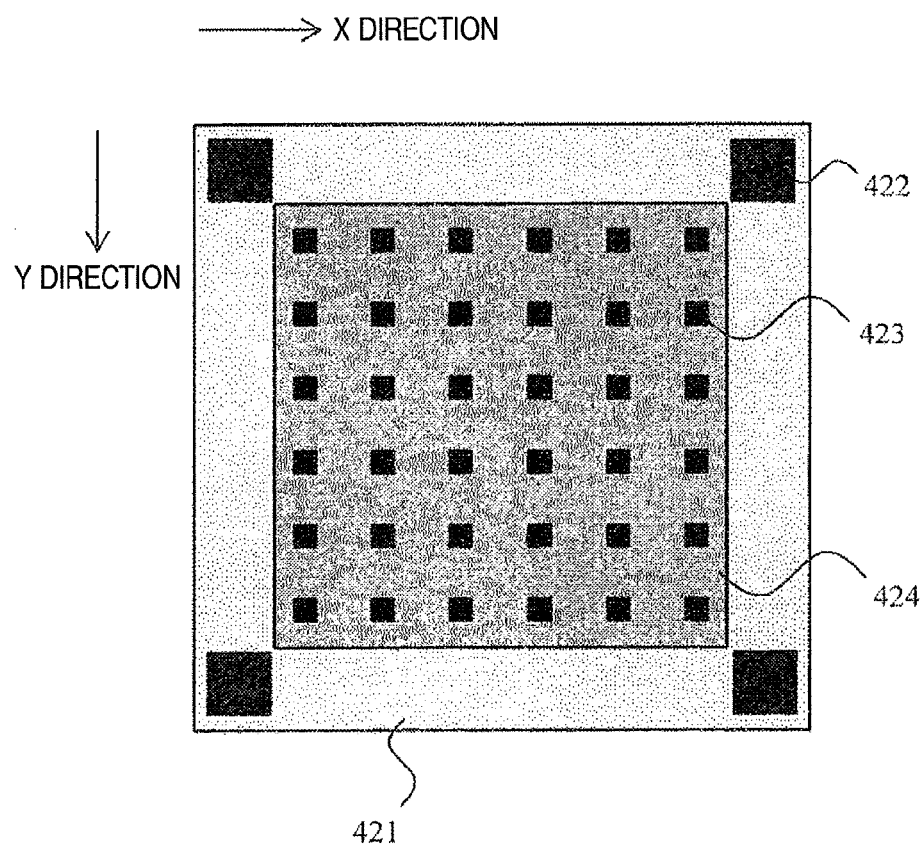
FIG. 12 is a schematic diagram showing an embodiment of a page.

FIG. 12 is a schematic diagram showing an embodiment of a page. In a page 421, sync marks 422 are disposed at four corners. The sync marks 422 are utilized for correction of position deviation, rotation and magnification deviation of the page. After the pickup has detected the page, position detection of the sync marks 422 is first conducted. In a data portion 424 in the page 421, markers 423 are disposed. The markers 423 are provided to cope with position deviation that cannot be removed with the correction utilizing the sync marks 422. Position deviation of the data portion is calculated on the basis of position information of the markers 423, and the data portion is detected. In some cases, a pitch of pixels smaller than that of the spatial light modulator is used as the pitch of pixels of a camera in the pickup. When detecting the data portion in this case, oversampling canceling processing of restoring the pitch of pixels in the camera to the pixel size of the spatial light modulator on the basis of information of position deviation of the data portion is conducted.

Figure 11:
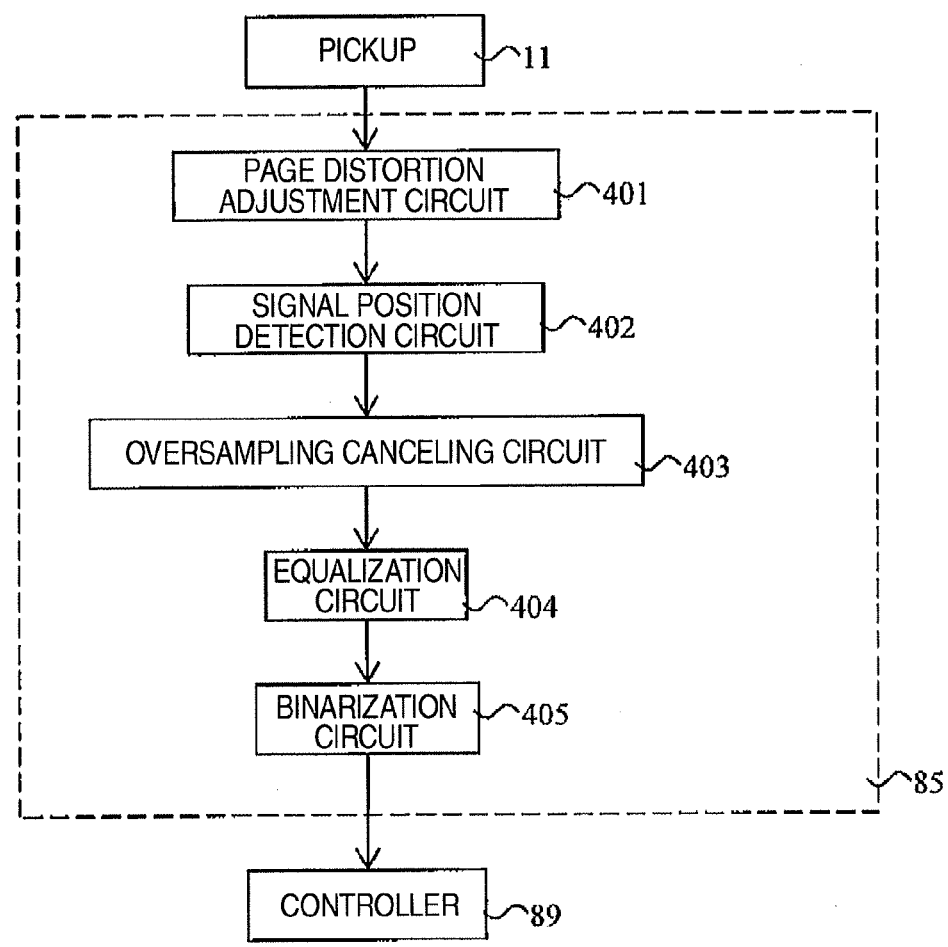
FIG. 11 is a schematic diagram showing an embodiment of a signal processing circuit in an optical information recording and reproducing device.

FIG. 11 is a schematic diagram showing an embodiment of the signal processing circuit in the optical information recording and reproducing device. The pickup 11 outputs a detected reproduced page to a page distortion adjustment circuit 401. The page distortion adjustment circuit 401 detects sync marks in an input reproduced page, calculates a position deviation quantity, a rotation quantity and a magnification deviation quantity on the basis of position information of the sync marks, and outputs page data corrected in these deviations to a signal position detection circuit 402. For the correction of the deviation quantity, the affine transformation utilized in, for example, the image processing field is utilized. The signal position detection circuit 402 receives corrected page data, detects position information of each signal by using a method which will be described later, and outputs page data and position information of each signal to an oversampling canceling circuit 403. The oversampling canceling circuit 403 receives the page data and position information of each signal, cancels the oversampling of the page data to make the number of pixels in page data equal to the number of pixels in the spatial light modulator, and outputs the page data subjected to the oversampling canceling to an equalization circuit 404. As for a method of oversampling, for example, a method of using filter coefficients for oversampling canceling at each position deviation quantity previously calculated and conducting FIR filter processing is used. The equalization circuit 404 receives the page data subjected to the oversampling canceling, removes inter-pixel interference by conducting FIR filter processing, and outputs page data subjected to filter processing to a binarization circuit 405. The binarization circuit 405 receives page data subjected to the filter processing, binarizes the page data by using, for example, a threshold, the maximum likelihood decoding, or Viterbi decoding, and outputs binarized information to the controller 89.

Figure 1:
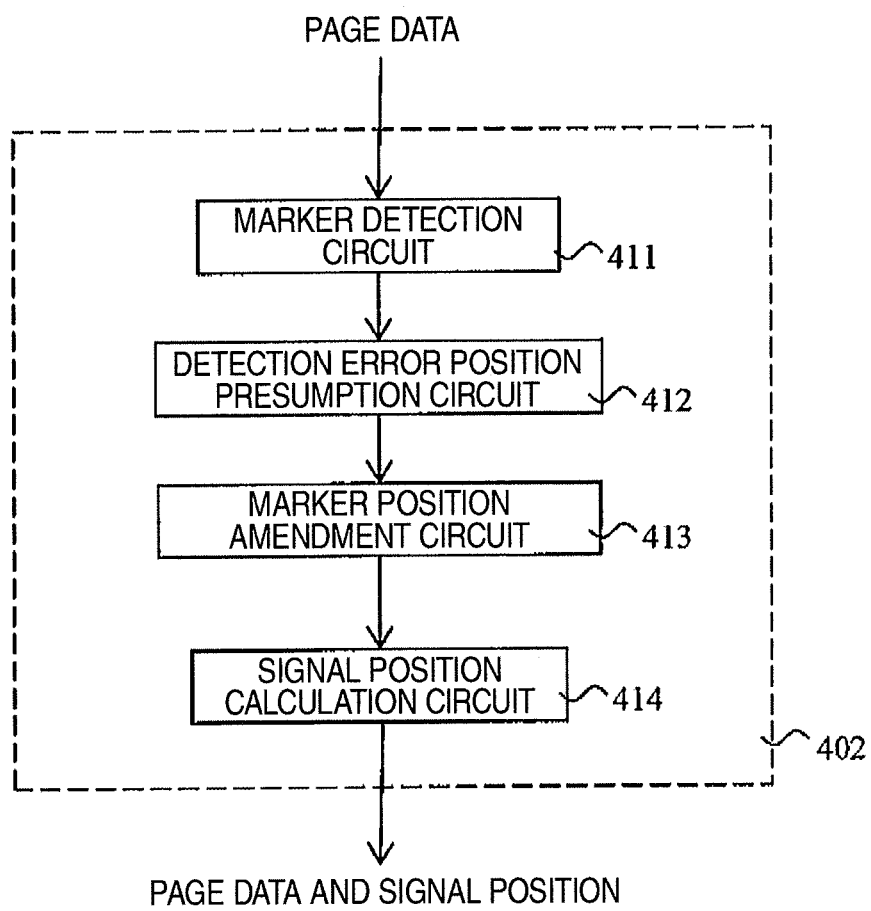
FIG. 1 is a schematic diagram showing an embodiment of a signal position detection circuit in an optical information recording and reproducing device.

FIG. 1 is a schematic diagram showing an embodiment of the signal position detection circuit in the optical information recording and reproducing device. A marker detection circuit 411 receives page data, detects a position of each marker in the page, and outputs the page data and marker position information to a detection error position presumption circuit 412. In marker position detection, for example, a cross-correlation coefficient between the known marker pattern and a page data signal is calculated, and a position where the cross-correlation coefficient is maximized is identified as marker position. The detection error position presumption circuit 412 receives the page data and the marker position information, presumes a detection error position of the marker position, and outputs the detection error position of the marker position and the page data to a marker position amendment circuit 413. As for presumption of the detection error position of the marker position, for example, a difference between a deviation quantity of a marker position and an average value of deviation quantities of marker positions in the vicinity is calculated. In a case where the difference value is at least a predetermined value, it is judged that a detection error has occurred. Thereby, a detection error position of the marker position is identified. The marker position amendment circuit 413 receives the detection error position of the marker position and the page data, amends the marker position of the detection error position by, for example, linear interpolation from adjacent marker positions, and outputs the amended marker position information and the page data to a signal position calculation circuit 414. The signal position calculation circuit 414 receives the amended marker position information and the page data, calculates a position of a signal group in the vicinity of each marker by, for example, conducting linear interpolation from marker positions in the vicinity, and outputs each signal position and the page data.

Figure 13:
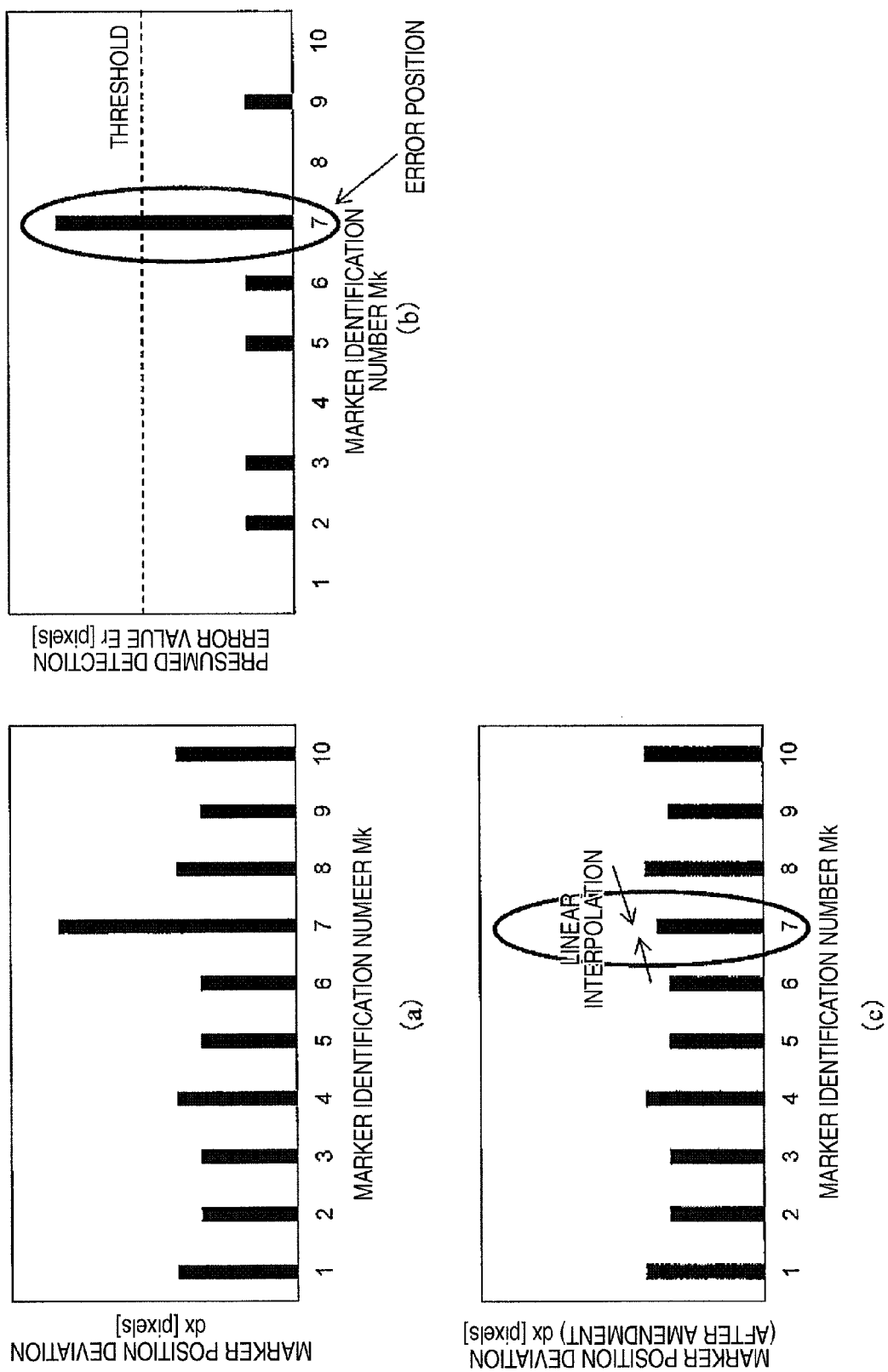
FIG. 13 is a schematic diagram showing examples of a marker position deviation quantity, a detection error estimated value, and a marker position deviation quantity (after corrected) at the time of marker detection.

FIG. 13 is a schematic diagram showing examples of (a) a marker position deviation quantity at the tune of marker detection, (b) a presumed detection error value, and (c) a marker position deviation quantity (after correction). As shown in FIG. 13(a), a marker position deviation dx for each marker is calculated. A presumed detection error value Er shown in FIG. 13(b) can be calculated by, for example, calculating a difference from an average value of position deviation quantities of markers in the vicinity as represented by the following Equation (1).

$$Er = |dx - \text{average value of } dx|  \quad \text{Equation (1)}$$

For example, it is presumed that a detection error occurs in a marker that indicates a presumed detection error value Er exceeding a predetermined threshold. As shown in FIG. 13(c), the marker position deviation quantity is amended by conducting linear interpolation according to Equation (2) from position deviation quantities of adjacent markers. Here, $dx_n$ indicates a position deviation quantity of an n-th marker. Equation (2) represents an example of a case where a detection error occurs in the nth marker. By the way, in a case where detection errors occur consecutively, for example, calculation is conducted by linear interpolation from markers in the vicinity in which detection error does not occur.

$$dx_n = (dx_{n-1} + dx_{n+1})/2$$

Figure 14:
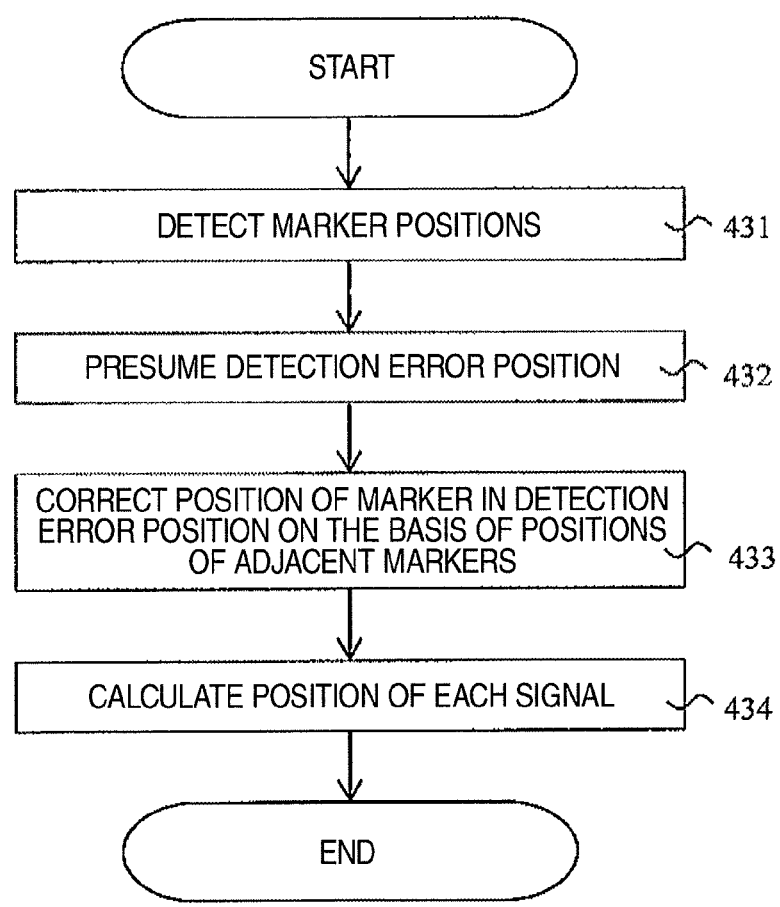
FIG. 14 is a schematic diagram showing an embodiment of an operation flow of signal position detection in an optical information recording and reproducing device.

FIG. 14 is a schematic diagram showing an embodiment of an operation flow of signal position detection in the optical information recording and reproducing device. At the time of signal position detection, marker positions are first detected by utilizing cross-correlation coefficients or the like at 431. Then, a marker detection error position is presumed at 432. A position of a marker in the detection error position is corrected on the basis of positions of adjacent markers at 433. Finally, the position of each signal is calculated by utilizing information of the marker positions at 434. By the way, although not illustrated, for example, it is also possible to cancel the oversampling on the basis of the amended marker position information and determine whether amendment of the marker position information was proper on the basis of an SNR value. Furthermore, for example, in a case where the SNR is low, processing, such as conducting interpolation by utilizing information of different markers, may be continued.

By the way, as for the threshold used for judgment of the marker detection error, a value that the device previously has may be used or first, learning of the threshold may be conducted by using the SNR or the like as an index. Furthermore, as for the technique for judging the reliability of a marker, another configuration using the SNR of the marker is also conceivable. In the present embodiment, the point that the reliability of the marker itself is judged is especially distinctive. It is a matter of course that there is a judging technique other than the present embodiment.

In the method in the present embodiment, amendment of the marker position can be implemented by using only information in the same page. Therefore, there is an advantage that the device configuration can be simplified.

In the ensuing description, description of contents common to the present embodiment will be omitted.

Embodiment 2

A second embodiment in the present invention will now be described with reference to FIGS. 15 and 16.

Figure 15:
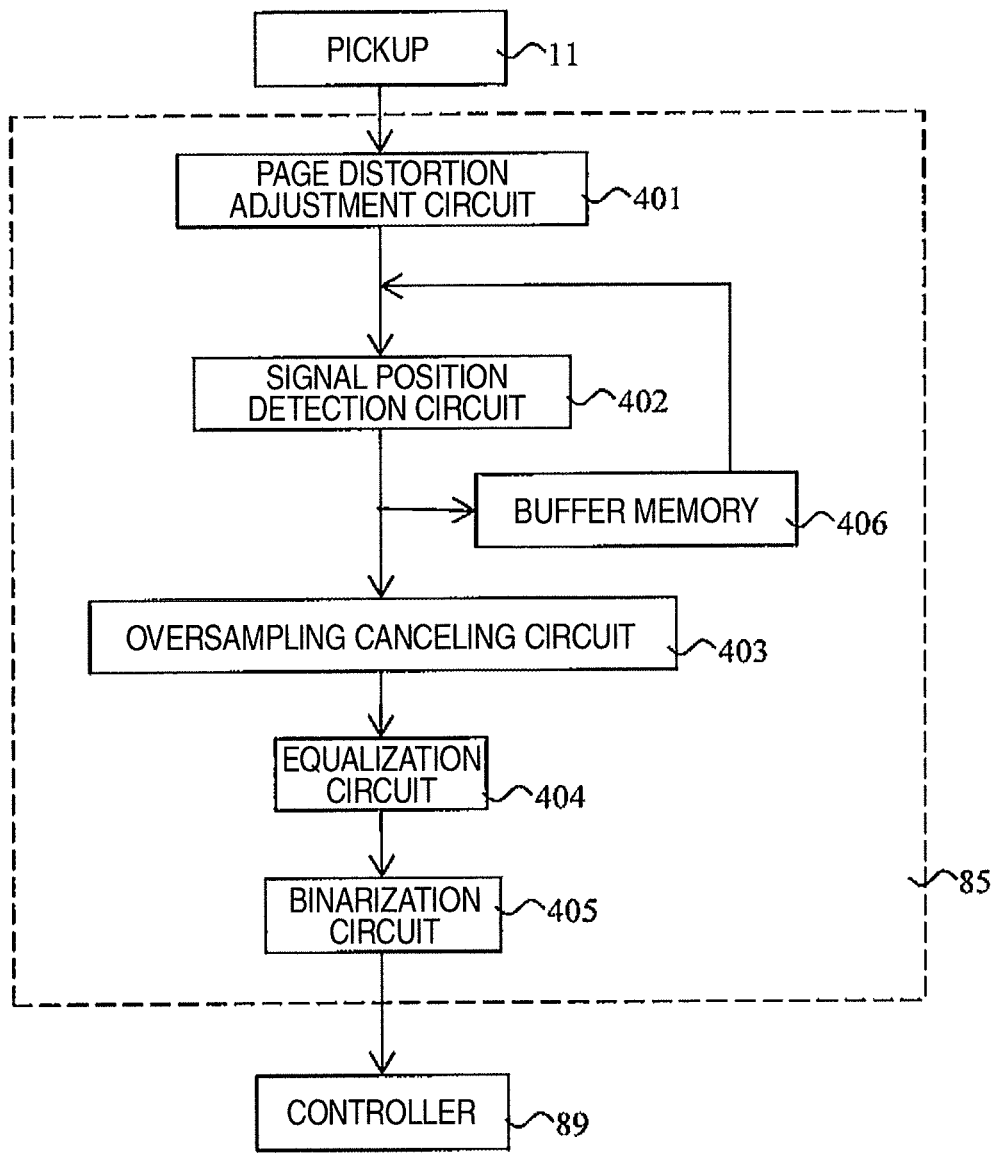
FIG. 15 is a schematic diagram showing an embodiment of a signal processing circuit in an optical information recording and reproducing device.

FIG. 15 is a schematic diagram showing an embodiment of the signal processing circuit in the optical information recording and reproducing device. A difference from the circuit shown in FIG. 11 in the embodiment 1 is that a buffer memory 406 is added. The signal position detection circuit 402 receives page data. At time of a page other than the start page, the signal position detection circuit 402 receives marker position deviation information of a previous page as well. The signal position detection circuit 402 detects position information of each signal by using a method which will be described later. The signal position detection circuit 402 outputs corrected page data and the position information of each signal to an oversampling cancel circuit 403, and outputs marker position deviation information to a buffer memory 406. The buffer memory 406 receives the marker position deviation information, and stores the marker position deviation information until time of processing of the next page. At time of signal position detection of the next page, the buffer memory 406 outputs the marker position deviation information to the signal position detection circuit 402. Operation of other circuits is common to that in the embodiment 1, and consequently description thereof will be omitted.

Figure 16:
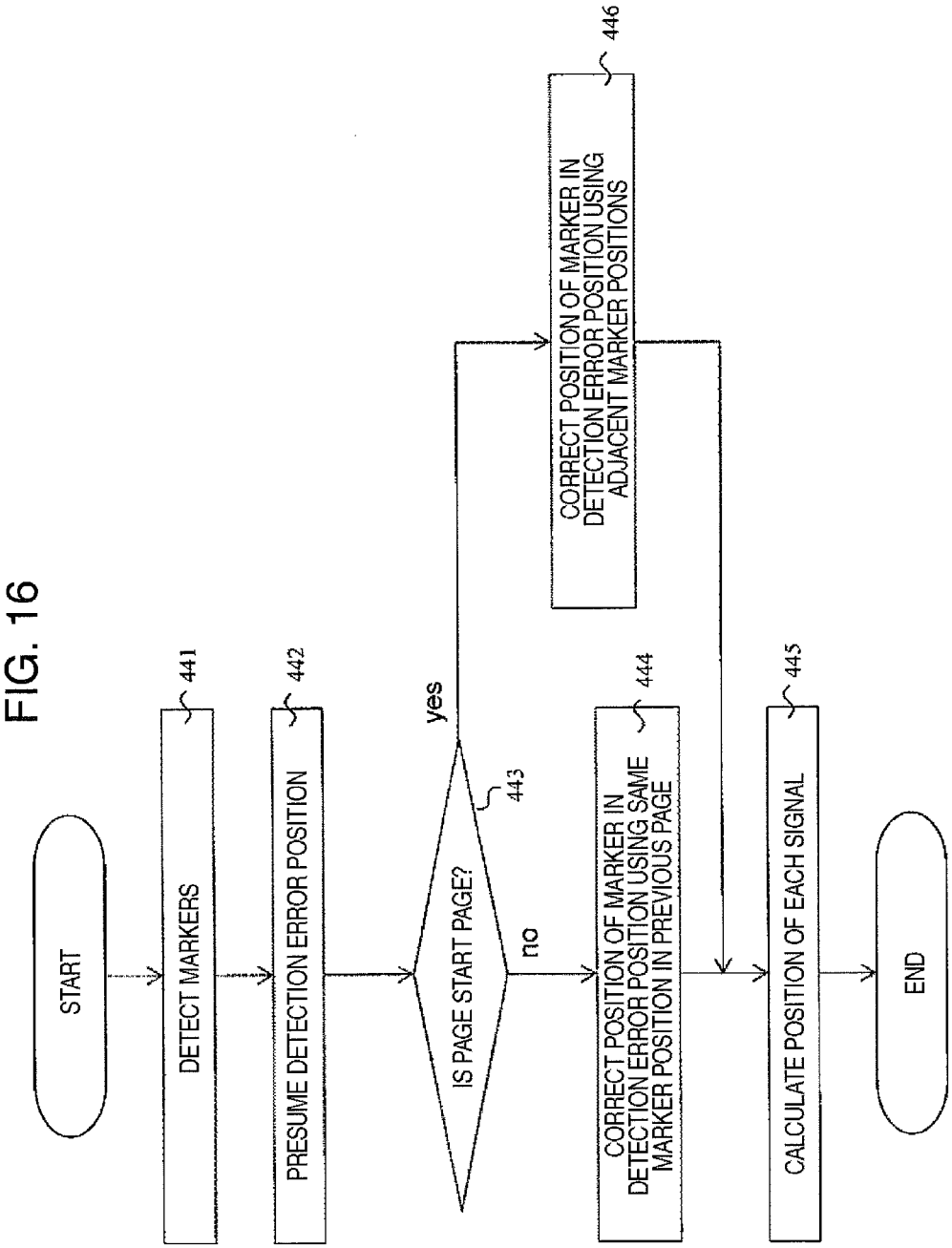
FIG. 16 is a schematic diagram showing an embodiment of an operation flow of signal position detection in an optical information recording and reproducing device.

FIG. 16 is a schematic diagram showing an embodiment of an operation flow of signal position detection in the optical information recording and reproducing device. At time of signal position detection, first, marker positions are detected by utilizing cross-correlation coefficients or the like at 441. Then, a marker detection error position is presumed at 442. It is determined at 443 whether a page subjected to the marker detection is the start page. Unless the page subjected to the marker detection is the start page at 443, the position of a marker in the detection error position is corrected on the basis of the same marker position in the previous page at 444. As for the correction of the marker position, the marker position deviation is calculated by, for example, regarding the marker position deviation as the same quantity as the position deviation quantity of the same marker position in the previous page, and the marker position is corrected. Finally, at 445, the position of each signal is calculated by utilizing the information of the marker positions. If the page subjected to the marker detection is the start page in determination at 443, the position of the marker in the detection error position is corrected on the basis of adjacent marker positions according to a method similar to that in embodiment 1, at 446.

By the way, although not illustrated, it is also possible to cancel the oversampling on the basis of, for example, amended marker position information and determine whether amendment of the marker position information was proper, on the basis of the SNR value. Furthermore, for example, in a case where the SNR is low, processing, such as conducting interpolation by utilizing information of a different marker, may be continued.

By the way, as for the presumption of the detection error position, the presumption may be conducted by conducting comparison with information of markers in the vicinity in the same page as described above, the presumption may be conducted by conducting comparison with information of markers in pages in the vicinity in the same book, or the presumption may be conducted by conducting comparison with information of markers in the same page or pages in the vicinity in another book.

Furthermore, as for the amendment of the detection error position, the marker position may be calculated supposing that deviation of the same quantity as a position deviation quantity of a marker in an adjacent page has occurred as described earlier, the marker position may be calculated by conducting linear interpolation or nonlinear interpolation on marker position information or a position deviation quantity on a page in the vicinity, the marker position may be calculated by conducting linear interpolation or nonlinear interpolation in the same way on marker position information or a position deviation quantity in a page in another book, or the marker position may be calculated supposing that a deviation of the same quantity has occurred.

In the method in the present embodiment, the marker position is amended by using information in another page. Therefore, there is an advantage that the precision is higher as compared with the method in the embodiment 1 in some cases.

In the ensuing description, description of contents common to the present embodiment will be omitted.

Embodiment 3

A third embodiment in the present invention will now be described with reference to FIG. 17. By the way, an embodiment of the device can be implemented by using a configuration similar to that in embodiment 2.

FIG. 17 is a schematic diagram showing an embodiment of an operation flow of signal position detection in the optical information recording and reproducing device. At the time of signal position detection, positions of markers are first detected by utilizing cross-correlation coefficients or the like at 451. Then, a marker detection error position is presumed at 452. At 453, the marker position in the detection error position is compared with a marker position in an adjacent page, and it is determined whether a detection error has actually occurred. As for the determination as to whether a detection error has actually occurred, for example, a difference between a position deviation quantity of the market position presumed to be a detection error at 452 and a position deviation quantity of a marker in the same position in an adjacent page is found. A portion where the difference value exceeds a predetermined threshold is judged that a detection error has occurred there. If the difference value is the predetermined threshold or less, it is judged that there is no detection error. In a case where a page which is being reproduced is a start page in a book, the next page may be reproduced, or it may be determined whether a detection error has occurred by conducting comparison with a marker position in the same page in another book. Only for a portion having no correlation with an adjacent page, the marker position is corrected according to methods described in embodiment 1 or 2, at 454. Finally, the position of each signal is calculated by utilizing information of the marker positions at 455.

By the way, as for the presumption of the detection error position, the presumption may be conducted by conducting comparison with information of markers in the vicinity in the same page as described above, the presumption may be conducted by conducting comparison with information of markers in pages in the vicinity in the same book, or the presumption may be conducted by conducting comparison with information of markers in the same page or pages in the vicinity in another book.

By the way, although not illustrated, it is also possible to cancel the oversampling on the basis of, for example, amended marker position information and determine whether amendment of the marker position information was proper, on the basis of the SNR value. Furthermore, for example, in a case where the SNR is low, processing, such as conducting interpolation by utilizing information of a different marker, may be continued.

Furthermore, as for the amendment of the detection error position, the marker position may be calculated supposing that deviation of the same quantity as a position deviation quantity of a marker in an adjacent page has occurred as described earlier, the marker position may be calculated by conducting linear interpolation or nonlinear interpolation on marker position information or a position deviation quantity on a page in the vicinity, the marker position may be calculated by conducting linear interpolation or nonlinear interpolation in the same way on marker position information or a position deviation quantity in a page in another book, or the marker position may be calculated supposing that a deviation of the same quantity has occurred.

As for the determination as to whether a detection error has actually occurred, it may be determined on the basis of a difference value from a position deviation quantity of a marker in the same position in an adjacent page in the same book as described earlier, or it may be determined on the basis of a difference value from a marker position deviation quantity in the same page in another book or in an adjacent page.

In the method in the present embodiment, it is determined whether a detection error has actually occurred, before amending the marker position. Therefore, detection with higher decision can be conducted in some cases.

By the way, the present embodiment can also be described as follows: an optical information reproducing device which reproduces information from optical information recording media having information recorded by utilizing holography, sync marks recorded for coarse adjustment, and markers recorded for fine adjustment, the optical information reproducing device including a detection unit for detecting position information of the sync marks and the markers from page data, which is a two-dimensional reproduced signal obtained from the optical information recording media, and a control unit for determining whether position information of a marker is reliable on the basis of position information of the marker detected by the detection unit, upon determining that there is a detection error, the control unit amending position information of the marker having the detection error on the basis of another marker.

The present invention is not restricted to the above-described embodiments, but various modifications are included. For example, the embodiments have been described in detail in order to describe the present invention intelligibly, and each of the embodiments is not necessarily restricted to the configuration having all described components. Furthermore, it is possible to replace a part of a configuration in an embodiment by a part of a configuration in another embodiment, and it is possible to add a part of a configuration in an embodiment to a configuration in another embodiment. Furthermore, as for a part of a configuration in each embodiment, it is possible to conduct addition, deletion, and replacement of a part of a configuration in another embodiment.

Furthermore, as for each of the above-described configurations, functions, processing units, and processing means, a part or the whole thereof may be implemented by hardware by, for example, designing using integrated circuits. Each of the above-described configurations, functions, and the like may be implemented by software by using a processor which interprets and executes a program implementing each function. Information such as a program, a table, and a file implementing each function can be stored in a storage device such as a memory, a hard disc, or an SSD (Solid State Drive) or recording media such as an IC card, an SD card, or a DVD.

Furthermore, as for control lines and information lines, those considered to be necessary for description are shown. All control lines and information lines on products are not necessarily shown. As a matter of fact, it may be considered that almost all components are connected to each other.

REFERENCE SIGNS LIST

1: Optical information recording media
10: Optical information recording and reproducing device
11: Pickup
12: Reproducing reference beam optical system
13: Disc cure optical system
14: Disc rotation angle detecting optical system
81: Access control circuit
82: Light source drive circuit
83: Servo signal generation circuit
84: Servo control circuit
85: Signal processing circuit
86: Signal generation circuit
87: Shutter control circuit
88: Disc rotary motor control circuit
89: Controller
90: Input/output control circuit
91: External control device
301: Light source
303: Shutter
306: Signal beam
307: Reference beam
308: Beam expander
309: Phase mask
310: Relay lens
311: PBS prism
312: Spatial light modulator
313: Relay lens
314: Spatial filter
315: Object lens
316: Polarization direction conversion element
320: Actuator
321: Lens
322: Lens
323: Actuator
324: Mirror
325: Photodetector
401: Page distortion adjustment circuit
402: Signal position detection circuit
403: Oversampling canceling circuit
404: Equalization circuit
405: Binarization circuit
406: Buffer memory
411: Marker detection circuit
412: Detection error position presumption circuit
413: Marker position amendment circuit
414: Signal position calculation circuit
421: Page
422: Sync mark
423: Marker
424: Data portion
501: Light source
502: Collimate lens
503: Shutter
504: Optical element
505: PBS prism
506: Signal beam
507: PBS prism
508: Spatial light modulator
509: Angle filter
510: Object lens
511: Object lens actuator
512: Reference beam
513: Mirror
514: Mirror
515: Lens
516: Galvanometer mirror
517: Actuator
518: Photodetector
519: Polarization direction conversion element
520: Drive direction
521: Optical block

The invention claimed is:

1. An optical information reproducing device which reproduces information from optical information recording media by utilizing holography, the optical information reproducing device comprising:
a detection unit for detecting position information of a marker, which is a known pattern, from a page, which is a two-dimensional signal reproduced from a hologram;
a detection error position presumption unit for presuming whether there is a detection error in marker position information in same page detected by the detection unit and presuming a position where a detection error occurs in a case where there is a detection error on the basis of position information of the marker detected by the detection unit within a predetermined range;

a position amendment unit for amending marker position information in the detection error position identified by the detection error position presumption unit; and a signal detection unit for detecting each signal from within a page on the basis of the marker position information amended by the amendment unit.

2. The optical information reproducing device according to claim 1, wherein the detection error position presumption unit presumes whether there is a detection error and presumes a position where a detection error occurs in a case where there is a detection error, on the basis of an SNR of a marker.

3. The optical information reproducing device according to claim 1, wherein the position amendment unit amends marker position information by conducting linear interpolation or nonlinear interpolation on a marker position presumed that a detection error has occurred there, on the basis of position information of a marker group in same page.

4. An optical information reproducing device which reproduces information from optical information recording media by utilizing holography, the optical information reproducing device comprising:

a detection unit for detecting position information of a marker, which is a known pattern, from a page, which is a two-dimensional signal reproduced from a hologram;

a recording unit for storing marker position information;

a detection error position presumption unit for presuming whether there is a detection error on the basis of position information of a marker in same position in a page different from a page that is being reproduced and presuming a position where a detection error occurs in a case where there is a detection error on the basis of position information of the marker within a predetermined range;

a position amendment unit for amending marker position information in the detection error position identified by the detection error position presumption unit; and a signal detection unit for detecting each signal from within a page on the basis of the marker position information amended by the amendment unit.

5. The optical information reproducing device according to claim 1, wherein the position amendment unit amends marker position information by conducting linear interpolation or nonlinear interpolation on a marker position presumed that a detection error has occurred there, on the basis of position information of a marker in same position in a page different from a page that is being reproduced, or by causing the marker position presumed that a detection error has occurred there to become same as a position of a marker in same position in a page different from a page that is being reproduced.

6. The optical information reproducing device according to claim 4, wherein the position amendment unit amends marker position information by conducting linear interpolation or nonlinear interpolation on a marker position presumed that a detection error has occurred there, on the basis of position information of a marker in same position in a page different from a page that is being reproduced, or by causing the marker position presumed that a detection error has occurred there to become same as a position of a marker in same position in a page different from a page that is being reproduced.

7. The optical information reproducing device according to claim 1, wherein the position amendment unit determines whether detection error presumption for a marker position presumed that a detection error has occurred there is proper on the basis of position information of a marker in same position in a page different from a page that is being reproduced, and amends position information of a marker determined that a detection error has occurred by conducting linear interpolation or nonlinear interpolation, on the basis of position information of a marker in same position in a page different from a page that is being reproduced, or by causing the marker position to become same as a position of a marker in same position in a page different from a page that is being reproduced.

8. The optical information reproducing device according to claim 4, wherein the position amendment unit determines whether detection error presumption for a marker position presumed that a detection error has occurred there is proper on the basis of position information of a marker in same position in a page different from a page that is being reproduced, and amends position information of a marker determined that a detection error has occurred by conducting linear interpolation or nonlinear interpolation, on the basis of position information of a marker in same position in a page different from a page that is being reproduced, or by causing the marker position to become same as a position of a marker in same position in a page different from a page that is being reproduced.

9. An optical information reproducing device which reproduces information from optical information recording media having information recorded by utilizing holography, sync marks recorded for coarse adjustment, and markers recorded for fine adjustment, the optical information reproducing device comprising:

a detection unit for detecting position information of the sync marks and the markers from page data, which is a two-dimensional reproduced signal obtained from the optical information recording media; and a control unit for determining whether position information of a marker is reliable on the basis of position information of the marker detected by the detection unit, upon determining that there is a detection error, the control unit amending position information of the marker having the detection error on the basis of another marker.

10. An optical information reproducing device which reproduces information from optical information recording media by utilizing holography, the optical information reproducing device comprising:

a detection unit for detecting position information of a marker, which is a known pattern, from a page, which is a two-dimensional signal reproduced from a hologram;

a detection error position presumption unit for presuming whether there is a detection error in marker position information in same page detected by the detection unit and presuming a position where a detection error occurs by comparing a deviation quantity of a marker position with an average value of deviation quantities of marker positions in a vicinity and determining that the detection error occurs and the error occurrence position when the difference between the deviation quantity of a marker position and the average value of deviation quantities of marker positions in a vicinity is larger than a predetermined value;

a position amendment unit for amending marker position information in the detection error position identified by the detection error position presumption unit; and a signal detection unit for detecting each signal from within a page on the basis of the marker position information amended by the amendment unit.

* * * * *